(12) United States Patent
Sujan et al.

(10) Patent No.: US 7,770,565 B2
(45) Date of Patent: Aug. 10, 2010

(54) SYSTEM AND METHOD FOR CONTROLLING AN EXHAUST GAS RECIRCULATION SYSTEM

(75) Inventors: Vivek A. Sujan, Columbus, IN (US); Morgan Andreae, Columbus, IN (US); Adrian P. Dale, Columbus, IN (US); Jeffrey A. Matthews, Columbus, IN (US)

(73) Assignee: Cummins Inc., Columbus, IN (US)

( * ) Notice: Subject to any disclaimer, the term of this patent is extended or adjusted under 35 U.S.C. 154(b) by 206 days.

(21) Appl. No.: 12/099,586

(22) Filed: Apr. 8, 2008

(65) Prior Publication Data

US 2009/0250043 A1 Oct. 8, 2009

(51) Int. Cl.
*F02B 47/08* (2006.01)
*F02B 47/00* (2006.01)

(52) U.S. Cl. .................................. 123/568.21

(58) Field of Classification Search ............ 123/568.21, 123/568.15, 568.11, 492, 493; 701/108; 60/274, 278
See application file for complete search history.

(56) References Cited

U.S. PATENT DOCUMENTS

| | | | |
|---|---|---|---|
| 4,184,470 A | 1/1980 | Iizuka | |
| 4,255,789 A | 3/1981 | Hartford et al. | |
| 4,757,683 A * | 7/1988 | Kawanabe et al. | ............ 60/274 |
| 6,276,334 B1 | 8/2001 | Flynn et al. | |
| 6,298,835 B1 | 10/2001 | Horie et al. | |
| 6,698,409 B1 | 3/2004 | Kennedy et al. | |
| 6,705,301 B2 | 3/2004 | Dollmeyer et al. | |
| 6,718,251 B2 | 4/2004 | Brackney et al. | |
| 6,725,829 B2 | 4/2004 | Kataoka et al. | |
| 6,732,522 B2 | 5/2004 | Wright et al. | |
| 6,837,227 B2 | 1/2005 | Jaliwala et al. | |
| 6,866,030 B1 * | 3/2005 | Sun et al. | ............... 123/568.21 |
| 6,954,693 B2 | 10/2005 | Brackney et al. | |
| 6,985,808 B1 | 1/2006 | Kennedy | |
| 7,025,042 B2 | 4/2006 | Gray, Jr. | |
| 2004/0084031 A1 * | 5/2004 | Ito et al. | ................ 123/568.21 |
| 2004/0149272 A1 | 8/2004 | Kurtz et al. | |
| 2004/0187842 A1 * | 9/2004 | Yang | ........................ 123/322 |
| 2009/0250042 A1 * | 10/2009 | Sujan et al. | ............ 123/568.21 |

FOREIGN PATENT DOCUMENTS

| | | |
|---|---|---|
| EP | 1077320 | 2/2001 |
| EP | 1333171 | 8/2003 |
| WO | WO2007/029064 | 3/2007 |

* cited by examiner

*Primary Examiner*—Mahmoud Gimie
(74) *Attorney, Agent, or Firm*—Barnes & Thornburg LLP; J. Bruce Schelkopf, Esq.

(57) ABSTRACT

A system and method are provided for controlling recirculation of exhaust gas to an internal combustion engine having an exhaust gas recirculation (EGR) system comprising an EGR conduit coupled between an exhaust manifold and an intake manifold of the engine. Exhaust gas produced by the engine is trapped within the EGR system in response to detection of a first operating condition that is indicative of a minimum engine fueling rate. The trapped exhaust gas is released from the EGR system into the intake manifold of the engine in response to detection of a second operating condition that is indicative of a subsequent increase in engine fueling rate above the minimum engine fueling rate.

8 Claims, 3 Drawing Sheets

US 7,770,565 B2

SYSTEM AND METHOD FOR CONTROLLING AN EXHAUST GAS RECIRCULATION SYSTEM

FIELD OF THE INVENTION

The present invention relates generally to internal combustion engines including an exhaust gas recirculation (EGR) system, and more specifically to systems and methods for selectively trapping exhaust gas in, and releasing exhaust gas from, an EGR system.

BACKGROUND

When a fueling rate of fuel supplied to an internal combustion engine is rapidly reduced to a minimum engine fueling rate, the flow rate of intake air entering the engine may for some time period remain undesirably high. The resulting high air-to-fuel ratios cause the engine to produce exhaust gas having high oxygen concentration. In engines that include an exhaust gas recirculation (EGR) system, this then causes high oxygen content exhaust gas to circulate through the EGR system. When the fueling rate is thereafter increased above the minimum engine fueling rate, the NOx content of the exhaust gas produced by the engine may spike to a higher than desired level due to the high oxygen content of the exhaust gas being circulated through the EGR system. It is therefore desirable to control the EGR system in a manner that reduces the amplitude of NOx spikes resulting from engine transient events.

SUMMARY

The present invention may comprise one or more of the features recited in the attached claims, and/or one or more of the following features and combinations thereof. A method is provided for controlling an exhaust gas recirculation (EGR) system comprising an EGR conduit coupled between an exhaust manifold and an intake manifold of an internal combustion engine. The method may comprise trapping exhaust gas produced by the engine within the EGR system in response to detection of a first operating condition that is indicative of a minimum engine fueling rate, and releasing the trapped exhaust gas from the EGR system into the intake manifold of the engine in response to detection of a second operating condition that is indicative of a subsequent increase in engine fueling rate above the minimum engine fueling rate.

The EGR system may further comprise an EGR valve disposed in-line with the EGR conduit. Trapping exhaust gas produced by the engine in the EGR conduit may then comprise controlling the EGR valve to a closed position so that exhaust gas that is within the EGR conduit when the EGR valve is closed is trapped within the EGR conduit. Releasing the trapped exhaust gas from the EGR system into the intake manifold may comprise controlling the EGR valve to at least a partially open position to allow exhaust gas flow through the EGR conduit.

In one illustrative embodiment, the first operating condition may correspond to disengagement of a clutch positioned between the engine and a transmission having a number of manually selectable gear ratios. The second operating condition may correspond to engagement of the clutch following the disengagement of the clutch.

In another illustrative embodiment, a fuel system may be operatively coupled to the engine. In this embodiment, the first operating condition may correspond to a requested fuel value being at or near the minimum engine fueling rate. The requested fuel value may correspond to a flow rate fuel requested to be delivered by the fuel system to the engine. The second operating condition may correspond to the requested fuel value increasing above the minimum engine fueling rate.

In yet another illustrative embodiment, an accelerator pedal may be manually actuatable between a reference position, corresponding to the minimum engine fueling rate, and a fully depressed position, corresponding to a maximum engine fueling rate. In this embodiment, the first operating condition may correspond to the reference position the accelerator pedal. The second operating condition may correspond to a position of the accelerator pedal that is between the reference position and the fully depressed position.

In still another illustrative embodiment, an engine compression brake may be operatively coupled to the engine. In this embodiment, the first operating condition may correspond to activation of the engine compression brake. The second operating condition may correspond to an increase in the engine fueling rate following subsequent deactivation of the engine compression brake.

A fuel system may be operatively coupled to the engine. The first operating condition may correspond to a requested fuel value being at or near a predefined engine fueling rate and a rate of change of the requested fueling rate being above a predefined fueling rate value. The requested fuel value may correspond to a flow rate fuel requested to be delivered by the fuel system to the engine. The second operating condition may correspond to the requested fuel value increasing above the minimum engine fueling rate.

A system for controlling recirculation of exhaust gas to an internal combustion engine may comprise an exhaust gas recirculation (EGR) conduit having one end fluidly coupled to an exhaust manifold of the engine and an opposite end fluidly coupled to an intake manifold of the engine, an EGR valve disposed in-line with the EGR conduit, an EGR valve actuator responsive to a close signal to close the EGR valve, and to an open signal to at least partially open the EGR valve, and a control circuit. The control circuit may include a memory having instructions stored therein that are executable by the control circuit to trap exhaust gas in the EGR conduit by producing the close signal upon detection of a first operating condition that is indicative of a minimum engine fueling rate, and to release the trapped exhaust gas from the EGR conduit into the intake manifold of the engine by producing the open signal upon detection of a second operating condition that is indicative of a subsequent increase in engine fueling rate above the minimum engine fueling rate.

In one illustrative embodiment, the system may further comprise a fuel system configured to supply fuel to the engine. The instructions stored in the memory unit may further include instructions that are executable by the control circuit to produce a requested fuel value corresponding to a flow rate of fuel requested to be delivered by the fuel system to the engine. The first operating condition may correspond to the requested fuel value being at the minimum engine fueling rate, and the second operating condition may correspond to the requested fuel value being above the minimum engine fueling rate.

In another illustrative embodiment, the system may further comprise an accelerator pedal that is movable between a reference position that corresponds to the minimum engine fueling rate and a fully depressed position that corresponds to a maximum engine fueling rate, and an accelerator pedal position sensor configured to produce an accelerator pedal position signal corresponding to a position of the accelerator pedal relative to the reference position of the accelerator pedal. The first operating condition may occur when the accelerator pedal position signal indicates that the accelerator pedal is in the reference position, and the second operating condition may occur when the accelerator pedal position signal indicates that the accelerator pedal is between the reference position and the fully depressed position.

In yet another illustrative embodiment, the system may further comprise a transmission having a number of manually selectable gear ratios, a clutch that is manually movable between an engaged position and a disengaged position, and a clutch position sensor configured to produce a clutch position signal corresponding to a position of the clutch. The first operating condition may occur when the clutch position signal indicates that the clutch is in the disengaged position, and the second operating condition may occur when the clutch position signal indicates that the clutch is in the engaged position.

In still another illustrative embodiment, the system may further comprise an engine compression brake configured to selectively apply a retarding force to the engine. The first operating condition may correspond to activation of the engine compression brake, and the second operating condition may correspond to an increase in the engine fueling rate following subsequent deactivation of the engine compression brake.

A method is provided for controlling an exhaust gas recirculation (EGR) system comprising an EGR conduit fluidly coupled between an exhaust manifold and an intake manifold of an internal combustion engine. The method may comprise trapping exhaust gas produced by the engine within the EGR system in response to disengagement of a clutch positioned between the engine and a transmission having a number of manually selectable gear ratios, and releasing the trapped exhaust gas from the EGR system into the intake manifold of the engine in response to subsequent engagement of the clutch.

The EGR system may further comprise an EGR valve disposed in-line with the EGR conduit. Trapping exhaust gas produced by the engine in the EGR conduit may comprise controlling the EGR valve to a closed position so that exhaust gas that is within the EGR conduit when the EGR valve is closed is trapped within the EGR conduit. Releasing the trapped exhaust gas from the EGR system into the intake manifold may comprise controlling the EGR valve to at least a partially open position to allow exhaust gas flow through the EGR conduit.

A system for controlling recirculation of exhaust gas to an internal combustion engine may comprise an exhaust gas recirculation (EGR) conduit having one end fluidly coupled to an exhaust manifold of the engine and an opposite end fluidly coupled to an intake manifold of the engine, an EGR valve disposed in-line with the EGR conduit, an EGR valve actuator responsive to a close signal to close the EGR valve, and to an open signal to at least partially open the EGR valve, a transmission having a number of selectable gear ratios, a clutch positioned between the engine and the transmission, the clutch being movable between engaged and disengaged positions, and a control circuit. The control circuit may include a memory having instructions stored therein that are executable by the control circuit to trap exhaust gas in the EGR conduit by producing the close signal when the clutch is disengaged, and to release the trapped exhaust gas from the EGR conduit into the intake manifold of the engine by producing the open signal when the clutch is engaged.

The system may further comprise a clutch position sensor configured to produce a clutch position signal corresponding to a position of the clutch. The instructions stored in the memory unit may further include instructions that are executable by the control circuit to process the clutch position signal to determine whether the clutch is disengaged or engaged.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
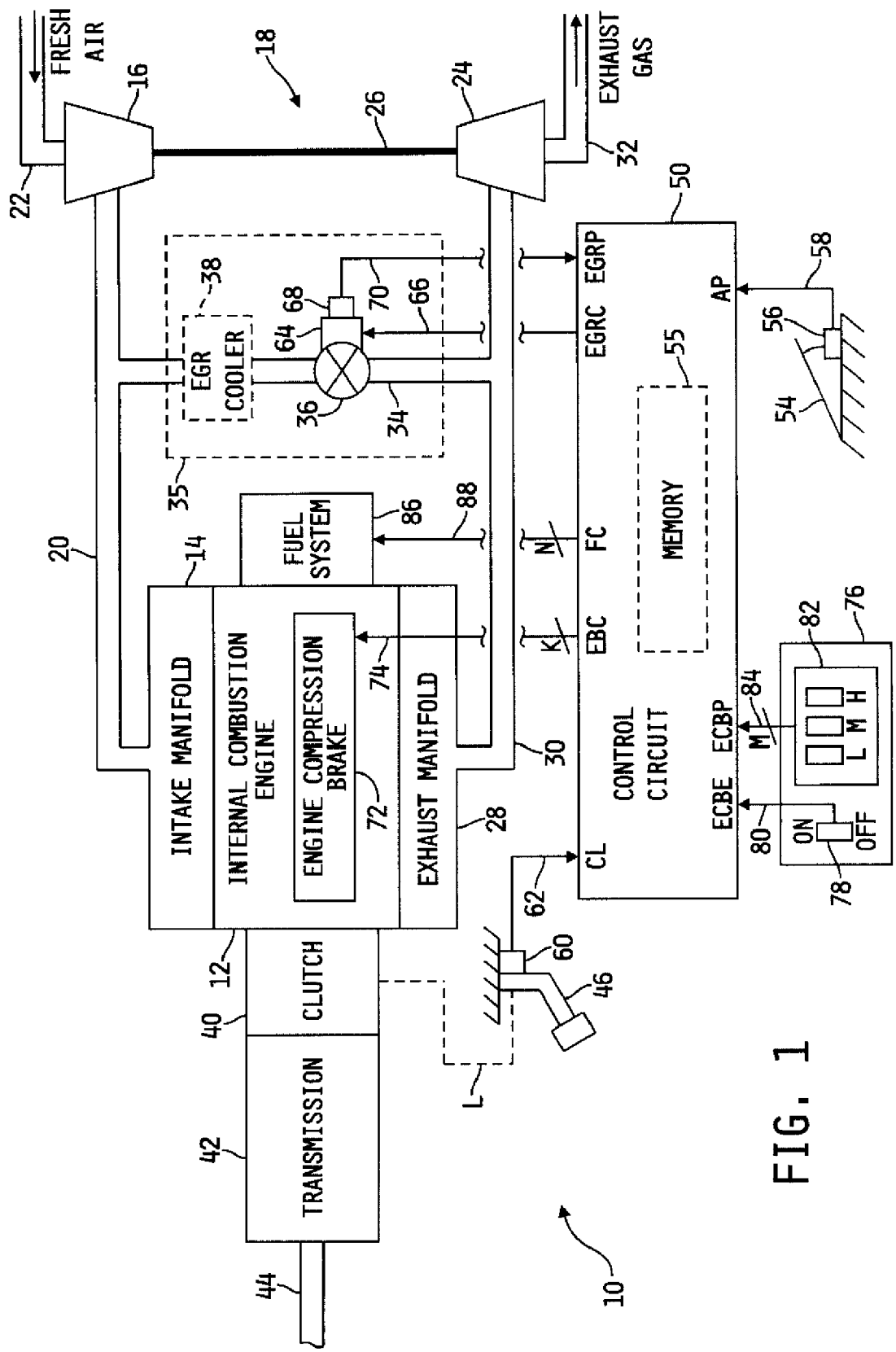
FIG. 1 is a diagrammatic illustration of one illustrative embodiment of a system for controlling operation of an EGR system of an internal combustion engine.

Referring now to FIG. 1, a diagrammatic illustration is shown of one illustrative embodiment of a system 10 for controlling an exhaust gas recirculation system 35. In the illustrated embodiment, the system 10 include an internal combustion engine 12 having an intake manifold 14 fluidly coupled to an outlet of a compressor 16 of a conventional turbocharger 18 via an intake conduit 20. The compressor 16 includes a compressor inlet coupled to an intake conduit 22 for receiving fresh air. The turbocharger compressor 16 is mechanically coupled to a turbocharger turbine 24 via a rotating drive shaft 26, and the turbine 24 includes a turbine inlet fluidly coupled to an exhaust manifold 28 of the engine 12 via an exhaust conduit 30. The turbine 24 includes a turbine outlet fluidly coupled to ambient via an exhaust conduit 32. It will be understood that the turbocharger 18 is not required for operation of the system 10 for purposes of this disclosure, and this disclosure accordingly contemplates embodiments of the system 10 that may not include the turbocharger 18.

The system 10 further includes an exhaust gas recirculation (EGR) system 35 including an EGR valve 36 or other flow restriction disposed in-line with an EGR conduit 34 that is fluidly coupled at one end to the intake conduit 20 and an opposite end to the exhaust conduit 30. An EGR cooler 38 of known construction may optionally be disposed in-line with the EGR conduit 34 between the EGR valve 36 and the intake conduit 20 as shown in phantom in FIG. 1, or between the exhaust conduit 30 and the EGR valve 36. In the latter embodiment, the EGR valve 36 may illustratively be positioned such that the exhaust gas outlet thereof is at or near the junction of the EGR conduit 34 and the intake conduit 20, although alternative positioning of the EGR valve 36 in this embodiment is contemplated.

In the embodiment illustrated in FIG. 1, the system 10 further includes a conventional clutch 40 that is operatively coupled at one end to the engine 12 and at an opposite end to one end of a conventional transmission 42 that has a number of manually selectable gear ratios. A tail shaft or propeller shaft 44 is rotatably coupled to the transmission 42 and extends rearwardly from an opposite end of the transmission 42. The number of manually selectable gear ratios of the transmission 42 may be engaged and disengaged in a conventional manner via a manually actuatable gear shift lever (not shown) under manual control of an operator of the vehicle carrying the engine 12, clutch 40 and transmission 42.

The system 10 further includes a control circuit 50 that is generally operable to control and manage the overall operation of the engine 12. The control circuit 50 includes a memory unit 55 as well as a number of inputs and outputs for interfacing with various sensors and systems coupled to the engine 12. The control circuit 50, is illustratively microprocessor-based, although this disclosure contemplates other embodiments in which the control circuit 50 may alternatively be or include a general purpose or application specific control circuit capable of operation as will be described hereinafter. In any case, the control circuit 50 may be a known control unit sometimes referred to as an electronic or engine control module (ECM), electronic or engine control unit (ECU) or the like. Illustratively, the memory 55 of the control circuit 50 has stored therein one or more sets of instructions that are executable by the control circuit 50, as will be described in greater detail hereinafter, to control the operation of the EGR system 35.

The control circuit 50 includes a number of inputs for receiving signals from various sensors or sensing systems associated with system 10. The control circuit 50 is generally operable in a conventional manner to sample the signals produced by the various sensors or sensing systems and to processes the sampled signals to determine the associated engine operating condition. For example, the system 10 includes a conventional clutch pedal 46 that is mechanically coupled to the clutch 40 via a mechanical linkage, L, and that includes a clutch pedal position sensor 60 that is electrically connected to a clutch pedal position input, CL, of the control circuit 50 via a signal path 62. The clutch pedal position sensor 60 is configured to produce a clutch position signal on the signal path 62 that is indicative of the position of the clutch pedal 46 relative to a reference position. Illustratively, the clutch pedal 46 is normally in a clutch engaged position, and the reference position of the clutch pedal 46 is in this case the clutch engaged position. In the clutch engaged position, as is known in the art, the clutch 40 mechanically engages the engine 12 with the transmission 42. The clutch pedal 46 is manually actuatable by an operator of the vehicle to a clutch disengaged position. In the clutch disengaged position, as is known in the art, the clutch 40 mechanically disengages the engine 12 from the transmission 42 so that, for example, a transmission shift can occur whereby a different one of the number of manually selectable gear ratios of the transmission 42 may be manually selected. In the illustrated embodiment, the clutch pedal position sensor 60 may be, for example, a switch that produces either a clutch engaged signal or a clutch disengaged signal depending upon the operational state of the clutch 40. Alternatively, the clutch pedal position sensor 60 may be implemented as a conventional analog position sensor, and the control circuit 50 may be programmed in a conventional manner to process the analog signal produced by such a sensor 60 to determine clutch engaged and clutch disengaged operating conditions.

The system 10 further includes an accelerator pedal 54 mechanically coupled to an accelerator pedal position sensor 56 that is electrically connected to an accelerator pedal position input, AP, of the control circuit 50 via a signal path 58. The accelerator pedal 54 is manually actuatable between a reference position and a fully depressed position, and the accelerator pedal position sensor 56 is configured to produce an accelerator position signal on the signal path 58 that is indicative of the position of the accelerator pedal 54 relative to the reference position. Illustratively, the accelerator pedal 54 is normally biased to its reference position which corresponds to an un-actuated or un-depressed position, and the reference position of the accelerator pedal 54 results in a minimum engine fueling rate, e.g., that which results in an engine idle condition. The fully depressed position of the accelerator pedal 54 conversely results in a maximum engine fueling rate. Illustratively, the accelerator pedal position sensor 56 is implemented as a conventional analog position sensor, and the control circuit 50 is programmed in a conventional manner to process the analog signal produced by the accelerator pedal position sensor 56 to determine a position of the accelerator pedal 54 relative to the reference accelerator pedal position.

The system 10 further includes a number of actuators for controlling one or operational aspects of the engine 12. For example, the EGR system 35 includes an EGR valve actuator 64 that is operatively coupled to the EGR valve 36, and an EGR valve position sensor 68 that is operatively coupled to the EGR valve actuator 64. The EGR valve actuator 64 is electrically coupled to an EGR valve control output, EGRC, of the control circuit 50 via a signal path 66. The EGR valve position sensor 68 is electrically connected to an EGR valve position input, EGRP, of the control circuit 50 via a signal path 70. The EGR valve actuator 64 is responsive to EGR valve control signals produced by the control circuit 50 at the EGRC output to control the position of the EGR valve 36 relative to a reference position. For example, the EGR valve actuator 64 is responsive to a close signal produce by the control circuit 50 at the EGRC output to close the EGR valve 36 so that no exhaust gas can flow through the EGR conduit 34. Closing the EGR valve 36 causes any exhaust gas that is within the EGR system 35, including the EGR conduit 34 and the EGR cooler 38 in embodiments that include the EGR cooler 38, when the EGR valve 36 is closed to become trapped within the EGR system 35. The EGR valve 36 is further responsive to an open signal to at least partially open so that exhaust gas can then flow from the exhaust manifold 28 to the intake manifold of the engine 12 via the exhaust gas conduits 3 and 34 and via the intake conduit 20. At least partially opening the EGR valve 36 further causes any exhaust gas previously trapped within the EGR system 35 to be released into the intake manifold 14 of the engine 12 via the intake conduit 20.

The EGR valve position sensor 68 is a conventional sensor that is configured to produce a position signal on the signal path 70 that corresponds to the position of the EGR valve 36 relative to the reference position. The control circuit 50 is operable, using known feedback control techniques, to control the EGR valve 36 to a desired EGR valve position by producing a corresponding EGR valve control signal, EGRC, on the signal path 66 based on the EGR valve position signal, EGRP, produced by the EGR valve position sensor 68 on the signal path 70. By controlling the position of the EGR valve 36, the control circuit 50 is operable to control selective trapping and release of exhaust gas within and from the EGR system 35.

The system 10 further includes a conventional engine compression brake 72 that is operatively coupled to the engine 12, and that is electrically coupled to the control circuit 50 via a number, K, of signal paths 74, wherein K may be any positive integer. The engine compression brake 72 is responsive to control signals produced by the control circuit 50 on the one or more signals paths 74 to produce or apply a corresponding retarding force that decreases the rotational speed of the engine 12. Illustratively, the engine compression brake 72 is operable, under the control of the control circuit 50, to selectively control the opening and closing times of one or more cylinder exhaust valves (not shown) via control of one or more corresponding cylinder valve actuators (not shown) to resultantly apply a braking or retarding force to the engine 12. An engine compression brake operation selector 76 is located in the cab area of the vehicle and includes a plurality of switches used to enable operation of the engine compression brake 72 and to control operation of the engine compression brake 72. For example, the engine compression brake operation selector 76 includes an ON/OFF switch 78 that is electrically connected to an engine compression brake enable input, ECBE, of the control circuit 50 via a signal path 80. When the switch 78 is in the ON position, the engine compression brake 72 is enabled for operation, and when the switch 78 is in the OFF position, operation of the engine compression brake 72 is disabled. Additional switches 82 are provided to allow for control of a relative amount of retarding force applied by the engine compression brake 72 when activated, and these switches are electrically connected to an engine compression brake position input, ECBP, of the control circuit 50 via a number, M, of signal paths 84, wherein M may be any positive integer. In the illustrated embodiment, three such switches, L, M and H, are provided to provide for user control of the engine compression brake 72 between corresponding low, medium and high engine retarding force settings. Alternatively, a single, three-position switch may be implemented in place of the three switches, L, M and H. In the illustrated embodiment, the engine compression brake 72 is enabled for operation when the ON/OFF switch 78 is in the ON position, and the engine compression brake 72 is activated if enabled and the engine fueling rate then drops to a minimum fueling rate, e.g., to an engine idle condition. This operational scenario occurs when, for example, the operator causes the accelerator pedal 54 to return to its reference position from a position other than the reference position, such as when braking, shifting to a different gear ratio of the transmission, or the like.

The system 10 further includes a fuel system 86 that is electrically connected to a fuel command output, FC, of the control circuit 50 via a number, N, of signal paths 88, wherein N may be any positive integer. The fuel system 86 is generally responsive to the fueling commands produced by control circuit 50 on the signal paths 88 to supply fuel, via one or more fuel injectors (not shown), to the engine 12, and the control circuit 50 is configured to produce such fueling commands in a manner well-known in the art.

The fueling commands produced by the control circuit 50 are produced under the control of at least one fuel control algorithm stored in the memory unit 55 and executed by the control circuit 50. The at least one fuel control algorithm is configured to compute the fueling commands as a function of a number of engine operating conditions as is known in the art. One such engine operating condition is a requested fueling value, RQF. The requested fueling value, RQF, is a conventional fueling value that represents user-requested fueling, e.g., via user actuation of the accelerator pedal 54 and/or user-setting of a conventional cruise control unit (not shown), which may be further limited or modified by one or more conventional algorithms resident within the memory 55 and executed by the control circuit 50. For purposes of this document, the requested fuel value, RQF, generally corresponds to a request for delivery of fuel by the fuel system 86 to the engine 12. The requested fuel value, RQF, may range between a minimum engine fueling rate, e.g., that which results in an engine idle condition, and a maximum engine fueling rate, e.g., a maximum allowable fueling rate.

Figure 2:
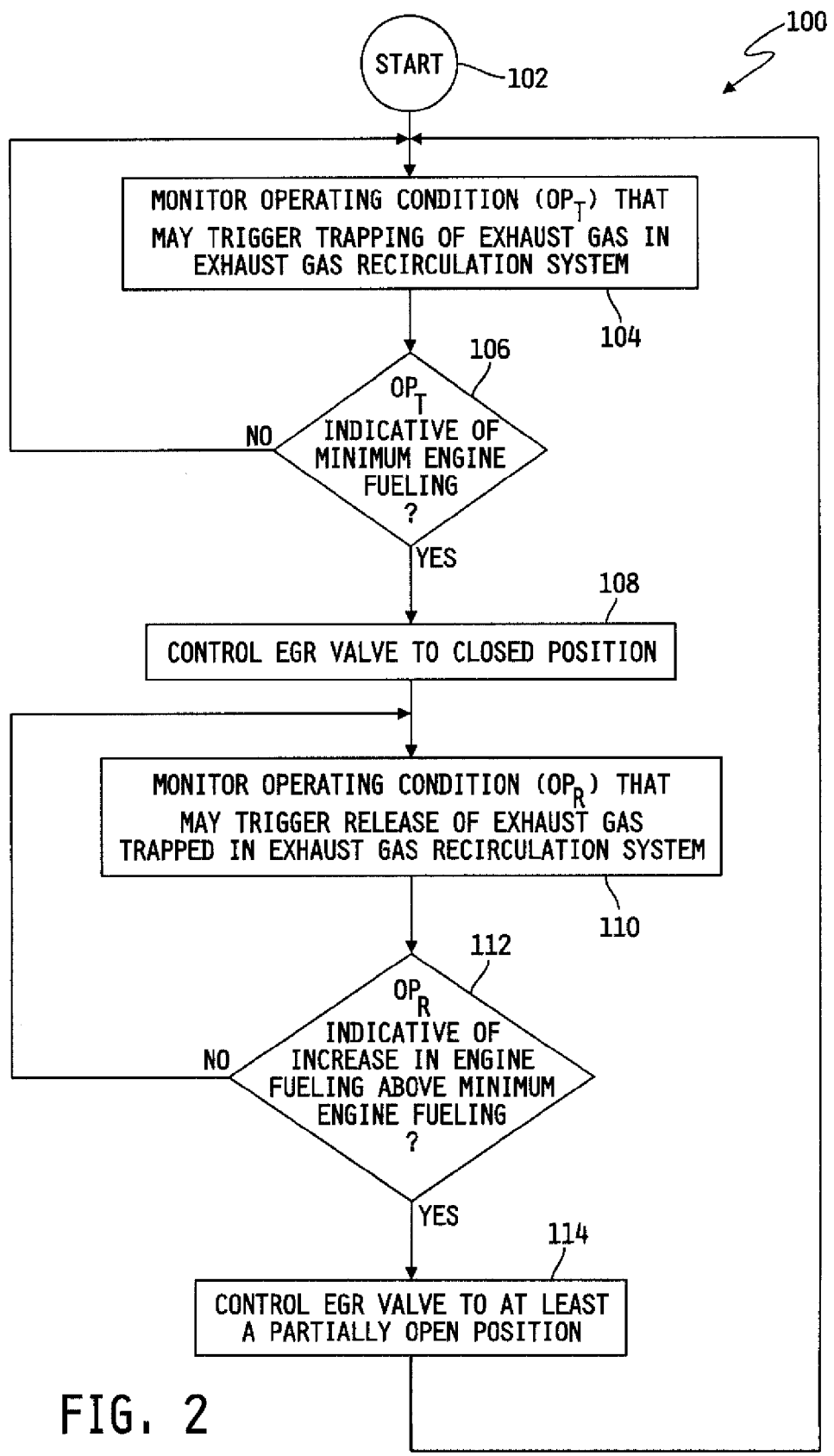
FIG. 2 is a flowchart of one illustrative embodiment of a process for controlling operation of an EGR system of an internal combustion engine.

Referring now to FIG. 2, a flowchart is shown of one illustrative embodiment of a process 100 for controlling operation of the EGR system 35. The process 100 is illustratively provided in the form of instructions that are stored in the memory unit 55 and that are executable by the control circuit 50 to control the flow of exhaust gas through the EGR system 35, i.e., to control the position of the EGR valve 36 to selectively trap and release exhaust gas within and from the EGR system 35.

The process 100 begins at step 102, and thereafter at step 104 the control circuit 50 is operable to monitor an operating condition, $OP_T$, that may trigger trapping of exhaust gas in the EGR system 35. Thereafter at step 106, the control circuit 50 is operable to determine whether $OP_T$ is indicative of a minimum engine fueling rate. Illustratively, the minimum engine fueling rate is a fueling rate that results in an engine idling condition, although the minimum engine fueling rate may alternatively correspond to an engine fueling rate that is near, e.g., within a threshold value of, the minimum engine fueling rate. In any case, if the control circuit 50 determines at step 106 that the operating condition, $OP_T$, is not indicative of the minimum engine fueling rate, the process 100 loops back to step 104. If instead the control circuit 50 determines at step 106 that the operating condition, $OP_T$, is indicative of the minimum engine fueling rate, the process 100 advances to step 108 where the control circuit 50 is operable to control the EGR valve 36 to a closed position to thereby trap exhaust gas that resided in the EGR system 35 at the time of closing the EGR valve 36 within the EGR system 35.

Execution of the process 100 advances from step 108 to step 110 where the control circuit 50 is operable to monitor an operating condition, $OP_R$, that may trigger release of exhaust gas trapped within the EGR system 35. Thereafter at step 112, the control circuit 50 is operable to determine whether $OP_R$ is indicative of an increase in engine fueling above the minimum engine fueling rate. If the control circuit 50 determines at step 112 that the operating condition, $OP_R$, is not indicative of an increase in the engine fueling rate above the minimum engine fueling rate, the process 100 loops back to step 110. If instead the control circuit 50 determines at step 112 that the operating condition, $OP_R$, is indicative of an increase in the engine fueling rate above the minimum engine fueling rate, the process 100 advances to step 114 where the control circuit 50 is operable to control the EGR valve 40 to at least a partially open position to allow exhaust gas flow through the EGR system 35 and thereby release any exhaust gas previously trapped in the EGR system 35. From step 114, the process 100 loops back to step 104.

The control circuit 50 is operable at steps 104-108 to monitor an operating condition, $OP_T$, and to control the EGR valve 36 to a closed position to trap exhaust gas within the EGR system 35 in response to detecting that the operating condition, $OP_T$, is indicative of the minimum fueling condition. The control circuit 50 is further operable at steps 110-114 to monitor an operating condition, $OP_R$, and to control the EGR valve 36 to at least a partially open position to release the previously trapped exhaust gas from the EGR system 35 into the intake manifold 14. Generally, the operating condition, $OP_T$, may be any operating parameter that is a direct or an indirect indicator of the engine fueling rate being at, near, or dropping to, the minimum fueling rate, and the operating condition, $OP_R$, may be any operating parameter that is a direct or an indirect indicator of the engine fueling rate thereafter increasing above the minimum engine fueling rate. In one illustrative embodiment, for example, the operating conditions, $OP_T$ and $OP_R$ are both the requested fueling value, RQF. In this embodiment, the operating condition, $OP_T$, is indicative of minimum engine fueling when the requested fueling value, RQF, is at, or near, the minimum engine fueling rate, and the operating condition, $OP_R$, is indicative of a subsequent increase in engine fueling rate above the minimum engine fueling rate when the requested fuel value, RQF, increases above the minimum engine fueling rate. Alternatively, the operating condition, $OP_T$, is indicative of minimum engine fueling when the requested fueling value, RQF, is at, or near, a threshold fueling rate that may or may not be the minimum engine fueling rate, and when the rate of change of the requested fueling rate, i.e., the rate of decrease of RQF, is greater than a specified rate of change value. In either embodiment, the operating condition that is indicative of minimum engine fueling and the operating condition that is indicative of the minimum engine fueling rate increasing above the minimum engine fueling rate are both direct indicators of minimum engine fueling rate and a subsequent increase in engine fueling rate.

In another illustrative embodiment, the operating conditions, $OP_T$ and $OP_R$, are both the position of the accelerator pedal 54. In this embodiment, the operating condition, $OP_T$, is indicative of minimum engine fueling when the position of the accelerator pedal 54 is the reference position of the accelerator pedal 54, and the operating condition, $OP_R$, is indicative of a subsequent increase in engine fueling rate above the minimum engine fueling rate when the accelerator pedal 54 is subsequently at a position that is between the reference position of the accelerator pedal 54 and the fully depressed position of the accelerator pedal 54. In this embodiment, the operating condition that is indicative of minimum engine fueling and the operating condition that is indicative of the minimum engine fueling rate increasing above the minimum engine fueling rate are again both direct indicators of minimum engine fueling rate and a subsequent increase in engine fueling rate.

In a further illustrative embodiment, the operating conditions, $OP_T$ and $OP_R$, are both functions of the oxygen content of charge entering the engine 12 via the intake manifold 14, the oxygen content of recirculated exhaust gas moving through the EGR system 35 and/or the oxygen content of the exhaust gas exiting the exhaust manifold 28. In this embodiment, the operating condition, $OP_T$, is indicative of minimum engine fueling when the oxygen content of the charge entering the intake manifold 14, the oxygen content recirculated exhaust gas moving through the EGR system 35 and/or the oxygen content of the exhaust gas exiting the exhaust manifold 28, and or a function of any combination thereof, indicates that the requested fueling, RQF, is at or near the minimum engine fueling rate, and the operating condition, $OP_R$, is indicative of a subsequent increase in engine fueling rate above the minimum engine fueling rate when the oxygen content of the charge entering the intake manifold 14, the oxygen content recirculated exhaust gas moving through the EGR system 35 and/or the oxygen content of the exhaust gas exiting the exhaust manifold 28, and or a function of any combination thereof, indicates that the requested fuel value, RQF, is increasing or has increased above the minimum engine fueling rate. Any of the oxygen content values in this embodiment may be measured via suitably located conventional oxygen sensors and/or estimated using one or more conventional oxygen content estimation techniques. In any case, the operating condition that is indicative of minimum engine fueling and the operating condition that is indicative of the minimum engine fueling rate increasing above the minimum engine fueling rate in this embodiment are both indirect indicators of minimum engine fueling rate and a subsequent increase in engine fueling rate.

In yet another illustrative embodiment, the operating conditions, $OP_T$ and $OP_R$, are both the operating position of the clutch 40. In this embodiment, the operating condition, $OP_T$, is indicative of minimum engine fueling when the clutch 40 is disengaged, as indicated by the clutch position signal produced by the clutch pedal position sensor 60, and the operating condition, $OP_R$, is indicative of a subsequent increase in engine fueling rate above the minimum engine fueling rate when the clutch 40 is engaged, as also indicated by the clutch position signal produced by the clutch pedal position sensor 60. Typically, disengagement of the clutch 40 occurs when the operator is attempting a shift to a different gear ratio of the transmission 42, when the operator is attempting to bring the vehicle to a complete stop, and the like, and therefore typically coincides with, or is followed by, a decrease in engine fueling to the minimum engine fueling rate. Likewise, engagement of the clutch 40 typically occurs when the gear shift process is complete and/or when a gear is engaged to launch the vehicle, and therefore is typically followed by an increase in the engine fueling rate above the minimum engine fueling rate. In this embodiment, the operating condition that is indicative of minimum engine fueling and the operating condition that is indicative of the minimum engine fueling rate increasing above the minimum engine fueling rate are thus both indirect indicators of minimum engine fueling rate and a subsequent increase in engine fueling rate.

In still another illustrative embodiment, the operating conditions, $OP_T$ and $OP_R$, are both the activation state of the engine compression brake 72. In this embodiment, the operating condition, $OP_T$, is indicative of minimum engine fueling when the engine compression brake is activated, and the operating condition, $OP_R$, is indicative of a subsequent increase in engine fueling rate above the minimum engine fueling rate when the engine compression brake 72 is thereafter deactivated. Typically, activation of the engine compression brake 72 occurs when the operator removes the operator's foot from the accelerator pedal 54 while the engine compression brake 72 is enabled for operation, and removal of the operator's foot from the accelerator pedal 72 typically causes engine fueling rapidly decrease to the minimum engine fueling rate. Likewise, deactivation of the engine compression brake 72 typically occurs when the operator thereafter depresses the accelerator pedal 54, thereby increasing the engine fueling rate above the minimum engine fueling rate. In this embodiment, the operating condition that is indicative of minimum engine fueling and the operating condition that is indicative of the minimum engine fueling rate increasing above the minimum engine fueling rate are again both indirect indicators of minimum engine fueling rate and a subsequent increase in engine fueling rate.

It will be understood that the second operating condition for any of the embodiments described above need not be the same indicator as for the first operating condition. Embodiments are contemplated in which, for example, the operating condition, $OP_T$, is indicative of minimum engine fueling when disengagement of the clutch 40 is detected, and the operating condition, $OP_R$, is indicative of a subsequent increase in engine fueling rate above the minimum engine fueling rate when the accelerator pedal 54 is thereafter moved to a position that is between the reference position and the fully depressed position or when the requested fuel value, RQF, is increased above the minimum engine fueling rate. Those skilled in the art will recognize other combinations of the operating conditions $OP_T$ and $OP_R$, and any such other combinations are contemplated by this disclosure.

Figure 3:
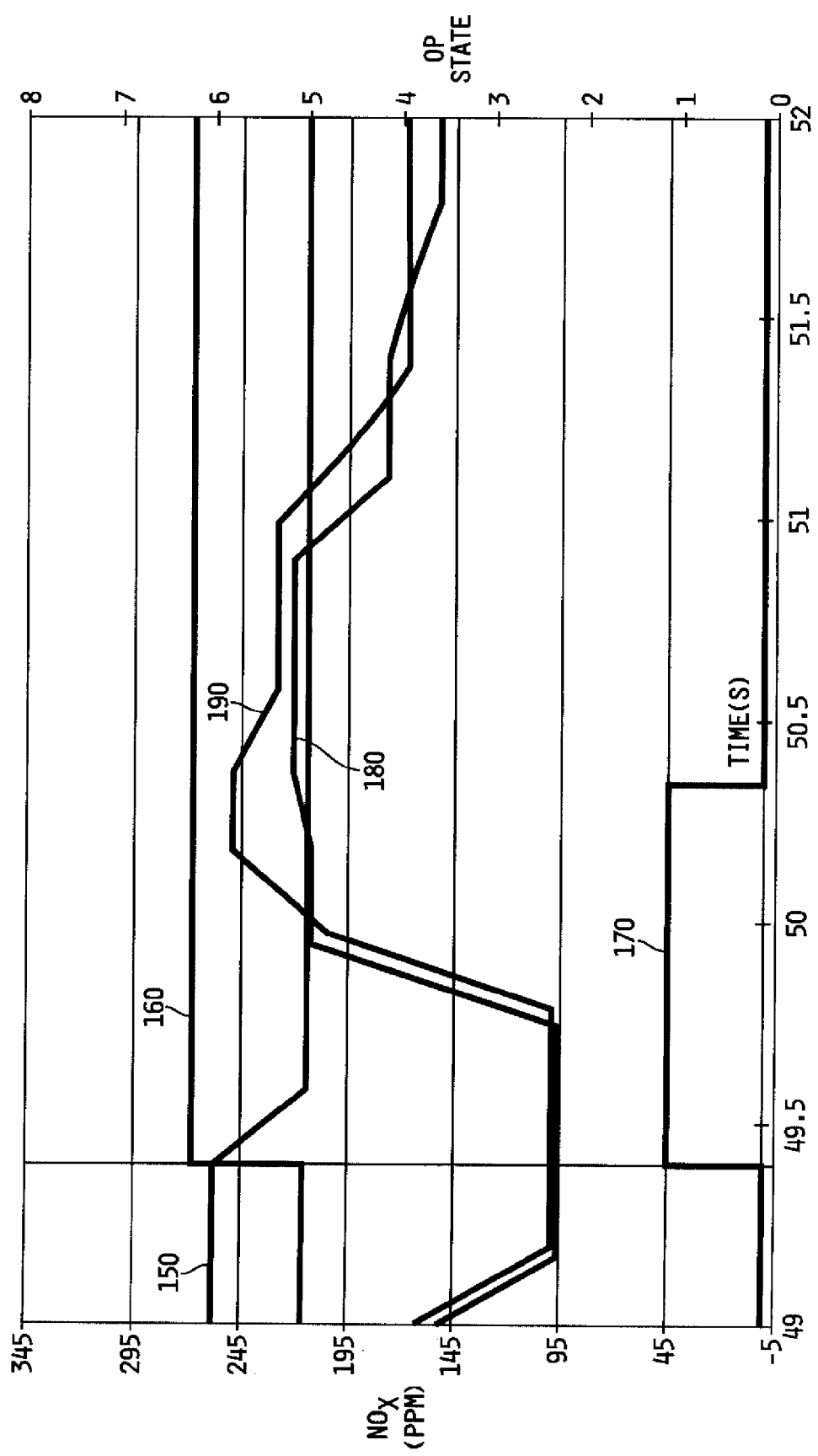
FIG. 3 is a plot of NOx produced by an internal combustion engine along with operational states of some operating parameters over time demonstrating the effect of the process of FIG. 2 on NOx produced by the engine.

Referring now to FIG. 3, a plot is shown of NOx produced by an internal combustion engine along with operational states of some the operating parameters associated with the engine over time to demonstrate the effect of the process 100 on NOx produced by the engine 12. The signal 150 corresponds to gear engagement such that the signal 150 has a logic high value when a shift is occurring, and otherwise has a logic low value. The signal 160 corresponds to the output of the clutch pedal position sensor 60, and the clutch pedal position signal 160 has a logic high value when the clutch 40 is engaged and has a logic low value when the clutch 40 is disengaged. The signal 170 corresponds to the position of the EGR valve 36, and the EGR valve position signal 170 has a logic high value when fully open and has a logic low value when closed. The signal 180 corresponds to the amount of NOx produced by the engine 12 (e.g., in units of parts per million, or ppm) when the EGR system 35 is controlled in the manner described herein.

In the example illustrated in FIG. 3, the EGR valve is controlled as a function of the operational state of the clutch 40 in accordance with one of the embodiments described hereinabove. While not specifically illustrated in FIG. 3, the control circuit 50 controls the EGR valve 36 to a closed position when the clutch pedal position signal 160 transitions to a logic low value which is indicative of a disengaged clutch 40. When the shift (signal 150) is thereafter complete, the clutch 40 is re-engaged as indicated in FIG. 3 by the clutch pedal position signal 160 transitioning to a logic high value. The control circuit 50 controls the EGR valve 36 to the open position when the clutch 40 is re-engaged as illustrated in FIG. 3. Thereafter when engine fueling increases above the minimum engine fueling rate, NOx begins to rise, but does not exceed approximately 220 ppm.

In contrast, the signal 190 corresponds to the amount of NOx produced by the engine 12 when the EGR valve 36 is controlled in a conventional manner before, during and after a gear shift. According to the conventional EGR valve control process in relation to a gear shift, the EGR valve 36 is typically opened when the engine fueling rate decreases to the minimum engine fueling rate just prior to disengagement of the clutch 40 in order to reduce fresh air flow to the engine 12. However, due to high air-to-fuel ratios under such conditions, the exhaust gas produced by the engine 12 will typically have higher than normal oxygen content. Opening the EGR valve 36 under these conditions thus results in circulating high oxygen content exhaust gas through the EGR system 35. When the engine fueling rate is increased following completion of the gear shift, a spike in NOx produced by the engine 12 occurs, as illustrated by the signal 190 in FIG. 3, as a result of the high oxygen content exhaust gas flowing through the EGR system 35. In the plot of FIG. 3, for example, the NOx spike corresponds to approximately 250 ppm. The control techniques described herein thus result in a smaller amount of NOx produced under transient conditions characterized by a minimum engine fueling rate followed by an increase in engine fueling rate above the minimum engine fueling rate.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of controlling an exhaust gas recirculation (EGR) system comprising an EGR conduit fluidly coupled between an exhaust manifold and an intake manifold of an internal combustion engine, the method comprising:

trapping exhaust gas produced by the engine within the EGR system in response to disengagement of a clutch positioned between the engine and a transmission having a number of manually selectable gear ratios, and releasing the trapped exhaust gas from the EGR system into the intake manifold of the engine in response to subsequent engagement of the clutch.

2. The method of claim 1 wherein the EGR system further comprises an EGR valve disposed in-line with the EGR conduit, wherein trapping exhaust gas produced by the engine in the EGR conduit comprises controlling the EGR valve to a closed position so that exhaust gas that is within the EGR conduit when the EGR valve is closed is trapped within the EGR conduit, and wherein releasing the trapped exhaust gas from the EGR system into the intake manifold comprises controlling the EGR valve to at least a partially open position to allow exhaust gas flow through the EGR conduit.

3. A system for controlling recirculation of exhaust gas to an internal combustion engine, the system comprising:

an exhaust gas recirculation (EGR) conduit having one end fluidly coupled to an exhaust manifold of the engine and an opposite end fluidly coupled to an intake manifold of the engine, an EGR valve disposed in-line with the EGR conduit, an EGR valve actuator responsive to a close signal to close the EGR valve, and to an open signal to at least partially open the EGR valve, a transmission having a number of selectable gear ratios, a clutch positioned between the engine and the transmission, the clutch being movable between engaged and disengaged positions, and a control circuit including a memory having instructions stored therein that are executable by the control circuit to trap exhaust gas in the EGR conduit by producing the close signal when the clutch is disengaged, and to release the trapped exhaust gas from the EGR conduit into the intake manifold of the engine by producing the open signal when the clutch is engaged.

4. The system of claim 3 further comprising a clutch position sensor configured to produce a clutch position signal corresponding to a position of the clutch, wherein the instructions stored in the memory unit include instructions that are executable by the control circuit to process the clutch position signal to determine whether the clutch is disengaged or engaged.

5. A method of controlling an exhaust gas recirculation (EGR) system comprising an EGR conduit fluidly coupled between an exhaust manifold and an intake manifold of an internal combustion engine having an engine compression brake operatively coupled thereto that is configured to selective apply a retarding force to the engine, the method comprising:

trapping exhaust gas produced by the engine within the EGR system in response to activation of the engine compression brake, and releasing the trapped exhaust gas from the EGR system into the intake manifold of the engine in response to an increase in engine fueling rate following deactivation of the engine compression brake subsequent to the activation of the engine compression brake.

6. The method of claim 5 wherein the EGR system further comprises an EGR valve disposed in-line with the EGR conduit, wherein trapping exhaust gas produced by the engine in the EGR conduit comprises controlling the EGR valve to a closed position so that exhaust gas that is within the EGR conduit when the EGR valve is closed is trapped within the EGR conduit, and wherein releasing the trapped exhaust gas from the EGR system into the intake manifold comprises controlling the EGR valve to at least a partially open position to allow exhaust gas flow through the EGR conduit.

7. A system for controlling recirculation of exhaust gas to an internal combustion engine, the system comprising:

an exhaust gas recirculation (EGR) conduit having one end fluidly coupled to an exhaust manifold of the engine and an opposite end fluidly coupled to an intake manifold of the engine, an EGR valve disposed in-line with the EGR conduit, an EGR valve actuator responsive to a close signal to close the EGR valve, and to an open signal to at least partially open the EGR valve, an engine compression brake configured to selectively apply a retarding force to the engine, and a control circuit including a memory having instructions stored therein that are executable by the control circuit to trap exhaust gas in the EGR conduit by producing the close signal when the engine compression brake is activated, and to release the trapped exhaust gas from the EGR conduit into the intake manifold of the engine by producing the open signal a fueling rate of the engine increases following deactivation of the engine compression brake subsequent to activation of the engine compression brake.

8. The system of claim 7 further comprising an engine compression brake selector including a plurality of switches that controls operation of the engine compression brake, wherein the instructions stored in the memory unit include instructions that are executable by the control circuit to monitor the plurality of switches to determine whether the engine compression brake is activated or deactivated.

* * * * *